(12) United States Patent
Xie et al.

(10) Patent No.: US 10,895,938 B2
(45) Date of Patent: Jan. 19, 2021

(54) TOUCH SUBSTRATE, TOUCH PANEL AND METHOD OF FABRICATING A TOUCH PANEL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xiaodong Xie, Beijing (CN); Weigang Gong, Beijing (CN); Ming Zhang, Beijing (CN); Jing Wang, Beijing (CN); Min He, Beijing (CN); Yu Zhu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 132 days.

(21) Appl. No.: 15/745,326

(22) PCT Filed: Aug. 18, 2017

(86) PCT No.: PCT/CN2017/098016
§ 371 (c)(1),
(2) Date: Jan. 16, 2018

(87) PCT Pub. No.: WO2018/145435
PCT Pub. Date: Aug. 16, 2018

(65) Prior Publication Data
US 2019/0087031 A1    Mar. 21, 2019

(30) Foreign Application Priority Data
Feb. 8, 2017 (CN) .......................... 2017 1 0069339

(51) Int. Cl.
*G06F 3/044* (2006.01)

(52) U.S. Cl.
CPC ............ *G06F 3/044* (2013.01); *G06F 3/0448* (2019.05); *G06F 2203/04103* (2013.01); *G06F 2203/04111* (2013.01)

(58) Field of Classification Search
CPC .................. G06F 3/0448; G06F 3/044; G06F 2203/04103; G06F 2203/04111; G06F 3/0443
See application file for complete search history.

(56) References Cited

U.S. PATENT DOCUMENTS

| 2014/0035864 A1 | 2/2014 | Chang et al. |
| 2014/0078104 A1* | 3/2014 | Lee ....................... G06F 3/0416 345/174 |

(Continued)

FOREIGN PATENT DOCUMENTS

| CN | 203706186 U | 7/2014 |
| CN | 105116630 A | 12/2015 |
| CN | 105849681 A | 8/2016 |

OTHER PUBLICATIONS

International Search Report & Written Opinion dated Nov. 27, 2017, regarding PCT/CN2017/098016.

(Continued)

*Primary Examiner* — Patrick N Edouard
*Assistant Examiner* — Douglas M Wilson
(74) *Attorney, Agent, or Firm* — Intellectual Valley Law, P.C.

(57) ABSTRACT

A touch panel, a touch substrate and a method of fabricating a touch panel are provided. The touch panel includes a touch substrate, and the touch substrate includes a plurality of regions and one of the plurality of regions includes a touch driving electrode; a touch sensing electrode that is at least partially overlapped with the touch driving electrode and (Continued)

touch sensing electrode is insulated from the touch driving electrode; and a touch Integrated Circuit (IC) that is connected to the touch sensing electrode, wherein the IC is capable of sensing a capacitance change when the touch driving electrode is pressed, and determining a position of the one of the plurality of regions corresponding the plurality of regions.

19 Claims, 9 Drawing Sheets

(56) References Cited

U.S. PATENT DOCUMENTS

| | | | |
|---|---|---|---|
| 2014/0210784 A1* | 7/2014 | Gourevitch | H03K 17/962 345/174 |
| 2015/0234492 A1* | 8/2015 | Lu | G06F 3/0412 345/174 |
| 2016/0378264 A1* | 12/2016 | Shih | G06F 3/044 345/174 |
| 2017/0010706 A1* | 1/2017 | Cok | G06F 3/04164 |
| 2017/0084605 A1 | 3/2017 | Liu et al. | |
| 2017/0185185 A1* | 6/2017 | Yoo | G06F 3/044 |
| 2017/0192544 A9* | 7/2017 | Huang | G06F 3/041 |
| 2019/0056833 A1* | 2/2019 | Lin | G06F 3/0418 |

OTHER PUBLICATIONS

First Office Action in the Chinese Patent Application No. 201710069339.0, dated May 7, 2019; English translation attached.

* cited by examiner

TOUCH SUBSTRATE, TOUCH PANEL AND METHOD OF FABRICATING A TOUCH PANEL

CROSS-REFERENCE TO RELATED APPLICATION

This application is a national stage application under 35 U.S.C. § 371 of International Application No. PCT/CN2017/098016, filed Aug. 18, 2017, which is filed based upon and claims priority to Chinese Patent Application No. 201710069339.0, filed on Feb. 8, 2017, the entire disclosures of which are incorporated herein by reference.

TECHNICAL FIELD

The disclosure relates to the field of touch technology, and in particular, to a touch substrate, a touch panel and a method of fabricating a display panel.

BACKGROUND

With the development of electronic products, a capacitive touchscreen becomes popular. The capacitive touchscreen has excellent touch function which makes people flock to it. With the development of the capacitive touchscreens, people have higher and higher requirements on optical performance, electrical performance, appearance and cost of the capacitive touchscreen. For the same specification, when the cost of the capacitive touchscreen is lower, more profits can be made in the marketplace. How to reduce the cost of the capacitive touchscreen becomes a research subject.

SUMMARY

This disclosure provides a touch substrate, a touch panel and a method of fabricating a display panel.

This disclosure provides a touch substrate, which may include a plurality of regions and one of the plurality of regions includes a first electrode including at least one elongated component, and a second electrode that is substantially overlapped with the first electrode, and the second electrode is insulated from the first electrode.

Optionally, the one of the plurality of regions further may include a touch Integrated Circuit (IC) that is connected to the second electrode, wherein the IC is capable of sensing a capacitance change when the first electrode is pressed, and determining a position of the one of the plurality of regions corresponding the plurality of regions.

Optionally, the first electrode is a touch driving electrode and the second electrode is a touch sensing electrode.

Optionally, the first electrode includes more than one elongated components to form a pattern, and the second electrode is substantially matched the pattern.

Optionally, the pattern may include at least one of: a comb-like shape, a star-like shape, a tree-like shape, a finger-like shape, a triangle-like shape, and a shape with the more than one elongated components to cross with each other.

Optionally, an oversized touch substrate is formed by stitching more than one touch substrates together.

Optionally, the touch substrate include a single Indium Tin Oxide (ITO) layer, and the single ITO layer comprises both the touch driving electrode and the touch sensing electrode.

This disclosure also provides a touch panel, which may include the touch substrate. The touch substrate may include a plurality of regions and one of the plurality of regions may include a first electrode including at least one elongated component, and a second electrode that is substantially overlapped with the first electrode, and the second electrode is insulated from the first electrode.

Optionally, the one of the plurality of regions further may include a touch Integrated Circuit (IC) that is connected to the second electrode, wherein the IC is capable of sensing a capacitance change when the first electrode is pressed, and determining a position of the one of the plurality of regions corresponding the plurality of regions.

Optionally, the first electrode is a touch driving electrode and the second electrode is a touch sensing electrode.

Optionally, the first electrode includes more than one elongated components to form a pattern, and the second electrode is substantially matched the pattern.

Optionally, the pattern includes at least one of a comb-like shape, a star-like shape, a tree-like shape, a finger-like shape, a triangle-like shape, and a shape with the more than one elongated components to cross with each other.

Optionally, an oversized touch substrate where the oversized touch substrate is formed by stitching more than one touch substrates together.

Optionally, the touch substrate includes a single Indium Tin Oxide (ITO) layer, and the single ITO layer comprises both the touch driving electrode and the touch sensing electrode.

Optionally, the touch panel may also include a black matrix layer and a second substrate, where the black matrix layer is sandwiched between the touch substrate and the second substrate.

Optionally, the touch panel also includes a color film substrate and a polarizer layer, where the touch substrate is placed between the polarizer layer and the color film substrate.

This disclosure further provide a method of fabricating a display panel, which may include forming a touch panel including a touch substrate, where the touch substrate may include a plurality of regions and one of the plurality of regions may include a first electrode comprising at least one elongated component, and a second electrode that is substantially overlapped with the first electrode, and the second electrode is insulated from the first electrode.

Optionally, the one of the plurality of regions further may include a touch Integrated Circuit (IC) that is connected to the second electrode, where the IC is capable of sensing a capacitance change when the first electrode is pressed, and determining a position of the one of the plurality of regions corresponding the plurality of regions.

Optionally, the first electrode includes more than one elongated components to form a pattern and the second electrode is substantially matched the pattern, where the pattern includes at least one of: a comb-like shape, a star-like shape, a tree-like shape, a finger-like shape, a triangle-like shape, and a shape with the more than one elongated components to cross with each other.

Optionally, the method may also include forming an oversized touch substrate by stitching more than one touch substrates together.

It is to be understood that both the foregoing general description and the following detailed description are exemplary and explanatory only and are not restrictive of the invention, as claimed.

BRIEF DESCRIPTION OF DRAWINGS

To illustrate the technical solutions of the embodiments of the disclosure more clearly, accompanying drawings used in the description of the embodiments are briefly described hereinafter. It is noted that the accompanying drawings illustrate some exemplary embodiments of the disclosure and persons of ordinary skill in the art may obtain other drawings based on these drawings without creative efforts.

Figure 1:
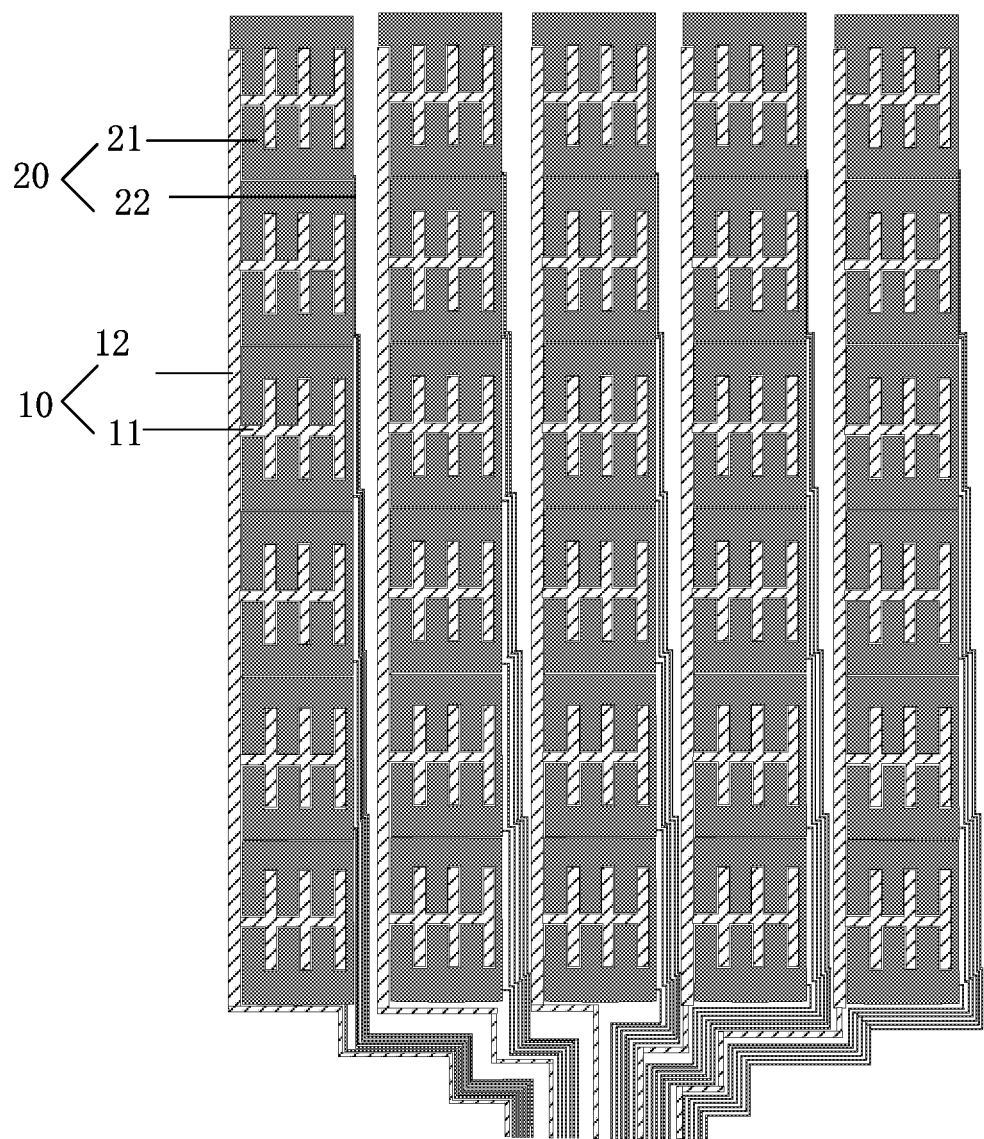
FIG. 1 is a schematic diagram illustrating structure of a touch substrate according to some embodiments of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

For making the object, the technical solution and the advantage of the disclosure more clear, the technical solution of the disclosure is described in detail and completely below in conjunction with the accompanying drawings that shows some embodiments of the disclosure. It is to be noted that the embodiments described are only some, but not all, of embodiments of the disclosure. Based on the described embodiments of the disclosure, all the other embodiments obtained by those skilled in the art are within the scope of protection of the disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information, and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Some embodiments of the disclosure provide a touch substrate. The touch substrate may be part of a touch panel. The touch substrate includes a substrate and a plurality of touch driving electrodes and a plurality of touch sensing electrodes arranged on the substrate. The touch driving electrodes and the touch sensing electrodes are arranged at the same layer and made of the same material, and the touch driving electrodes are insulated from the touch sensing electrodes. The touch driving electrodes and the touch sensing electrodes are arranged in a nesting manner.

Because the touch driving electrodes and the touch sensing electrodes are arranged at the same layer and made of the same material, they can be formed by a single composition process. That is, mutual capacitance touch can be implemented by using a single film. Thus, it is possible to reduce the production cost of the touch substrate effectively and to reduce the thickness of the touch substrate. Moreover, the touch driving electrode and the touch sensing electrode are arranged in the nesting manner. The interaction area between the touch driving electrode and the touch sensing electrode may be larger, such that a touch effect can be enhanced effectively.

The touch driving electrode and the touch sensing electrode may have various structures nested inside each other.

Optionally, the touch driving electrode and the touch sensing electrode each may include a comb-like structure, and the comb-like structure of the touching driving electrode and the comb-like structure of the touch sensing electrode may be nested inside each other. The comb teeth of the touch driving electrode are interleaved with the comb teeth of the touch sensing electrode. The touch driving electrode and the touch sensing electrode of the comb-like structures extend in a wide range, and the interaction area between the touch driving electrode and the touch sensing electrode is large. Thus, when a finger touches a touchscreen, the touchscreen can sense the position of the finger immediately, thereby achieving a good touch effect.

The nesting manner of the touch driving electrode and the touch sensing electrode are illustrated below.

Reference will be made to FIG. 1 which is a schematic diagram illustrating structure of a touch substrate according to some embodiments of the disclosure. The touch substrate includes: a substrate (not shown in the figure) and a plurality of touch driving electrodes 10 and a plurality of touch sensing electrodes 20 arranged on the substrate. The touch driving electrodes 10 and the touch sensing electrodes 20 are arranged at the same layer and made of the same material, and the touch driving electrodes 10 are insulated from the touch sensing electrodes 20.

Figure 2:
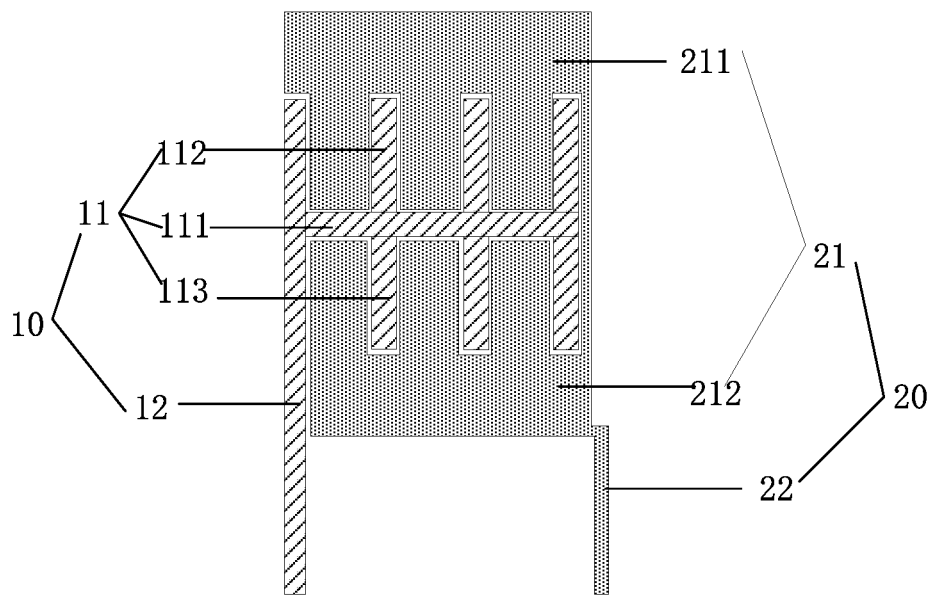
FIG. 2 is a partial enlarged view of a touch substrate in FIG. 1.

Reference will also be made to FIG. 2 which is a partial enlarged view of a touch substrate in FIG. 1. Each touch driving electrode 10 includes a first comb-like structure 11. The first comb-like structure 11 includes a strip-shaped comb ridge 111, and upper comb teeth 112 and lower comb teeth 113. The upper comb teeth 112 and lower comb teeth 113 are connected with the strip-shaped comb ridge 111 and respectively arranged at two sides of the strip-shaped comb ridge 111. The touch sensing electrode 20 includes a second comb-like structure 21. The second comb-like structure 21 includes an upper comb body 211 and a lower comb body 212. The comb teeth of the upper comb body 211 are arranged to face the comb teeth of the lower comb body 212. The first comb-like structure 11 is nested between the upper comb body 211 and the lower comb body 212 of the second comb-like structure 21. The comb teeth of the upper comb body 211 are interleaved with the upper comb teeth 112 of the first comb-like structure 11. The comb teeth of the lower comb body 212 are interleaved with the lower comb teeth 113 of the first comb-like structure 11.

In some embodiments of the disclosure, the touch driving electrode 10 includes the first comb-like structure 11, and the touch sensing electrode 20 includes the second comb-like structure 21. For example, in some other embodiments of the disclosure, alternatively, the touch driving electrode includes a second comb-like structure, and the touch sensing electrode includes a first comb-like structure. That is, the structures of the touch driving electrode and the touch sensing electrode are interchanged.

In some embodiments of the disclosure, a touch driving electrode 10 includes a plurality of first comb-like structures 11. The plurality of first comb-like structures 11 are connected through a driving electrode connecting wire 12, and connected with a touch IC through the drive electrode connecting wire 12. A touch sensing electrode 20 includes a second comb-like structure 21. The second comb-like structure 21 is connected with the touch IC through a sensing electrode connecting wire 22.

In some embodiments of the disclosure, both the touch driving electrodes 10 and the touch sensing electrodes 20 are arranged in a matrix. The touch driving electrodes 10 are substantially strip-shaped and arranged in one row and a plurality of columns. The touch sensing electrodes 20 as a whole are block-shaped and arranged in a plurality of rows and a plurality of columns. In some embodiments of the disclosure, a touch driving electrode 10 corresponds to a plurality of touch sensing electrodes 20 in a column direction.

In some embodiments of the disclosure, the touch driving electrode 10 extends in the column direction. As an example, in some other embodiments of the disclosure, the touch driving electrode may extend in a row direction. In such case, a touch driving electrode may correspond to a plurality of touch sensing electrodes in the row direction.

Figure 3:
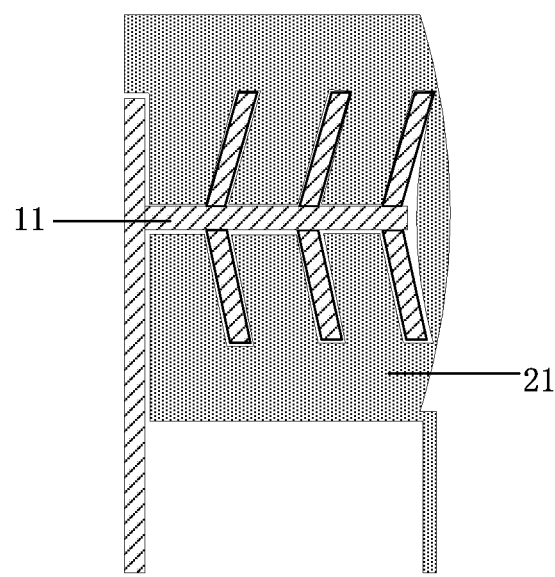
FIG. 3 is a schematic diagram illustrating structure of a touch substrate according to some embodiments of the disclosure.
Figure 4:
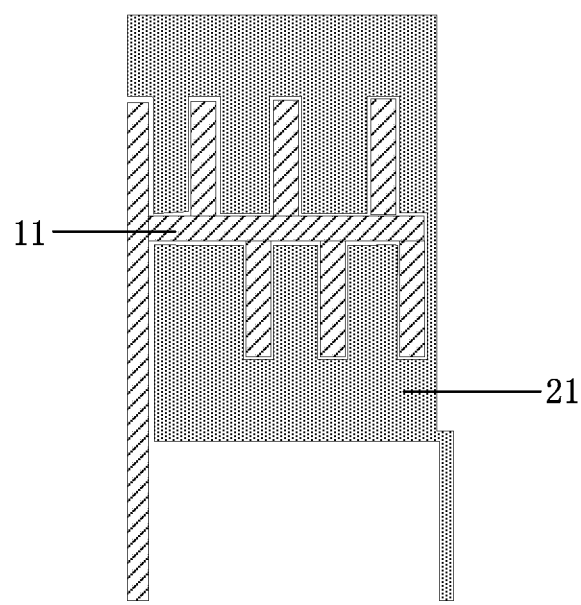
FIG. 4 is a schematic diagram illustrating structure of a touch substrate according to some embodiments of the disclosure.

In some embodiments of the disclosure, in the first comb-like structure 11, there is a one-to-one correspondence between the upper comb teeth 112 and the lower comb teeth 113, and the upper comb teeth and the lower comb teeth both are perpendicular to the strip-shaped comb ridge 111. Such structure is simple and makes the distribution of touch electrodes uniform. As an example, in some other embodiments of the disclosure, the first comb-like structure 11 may be in other types of structures, as shown in FIGS. 3 and 4. In some embodiment shown in FIG. 3, the comb teeth of the first comb-like structure 11 are slant comb teeth, and the second comb-like structure 21 is a corresponding complement structure. In some embodiments shown in FIG. 4, the upper comb teeth and the lower comb teeth of the first comb-like structure 11 are arranged to be staggered, and the second comb-like structure 21 is a corresponding complementary structure.

Figure 5:
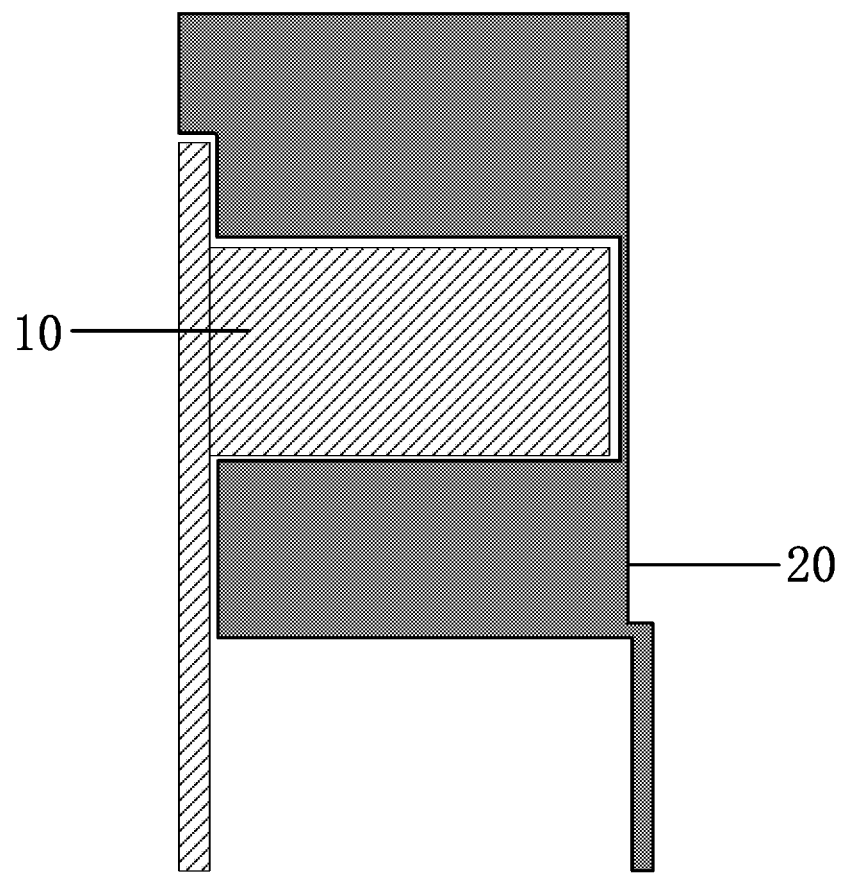
FIG. 5 is a schematic diagram illustrating structure of a touch substrate according to some embodiments of the disclosure.

In the above embodiments, the touch driving electrode 10 and the touch sensing electrode 20 are nested inside each other in a comb manner. As an example, the touch driving electrode 10 and the touch sensing electrode 20 may be arranged in other nesting manners, as shown in FIG. 5, which will not be described in detail here.

In some implementations, the touch driving electrode may include at least one elongated component, and the touch sensing electrode is substantially overlapped with the touch driving electrode. The elongated component of the touch driving electrode may form a pattern. The pattern may be a comb-like shape as shown in FIG. 2. In addition, the elongated component of the touch driving electrode may form the pattern that may be a star-like shape, a tree-like shape, a finger-like shape, a triangle-like shape or the like. The touch driving electrode and the touch sensing electrode may include more than one elongated components. The more than more elongated components may form a shape where the more than one elongated components to cross with each other. Thus, when the touch driving electrode is pressed, a touch Integrated Circuit (IC) that is connected to the touch sensing electrode may sense a capacitance change, and the position of the press may be determined.

Both the touch driving electrode 10 and the touch sensing electrode 20 are made of a transparent conductor material, for example, Indium Tin Oxide (ITO).

Figure 6A:
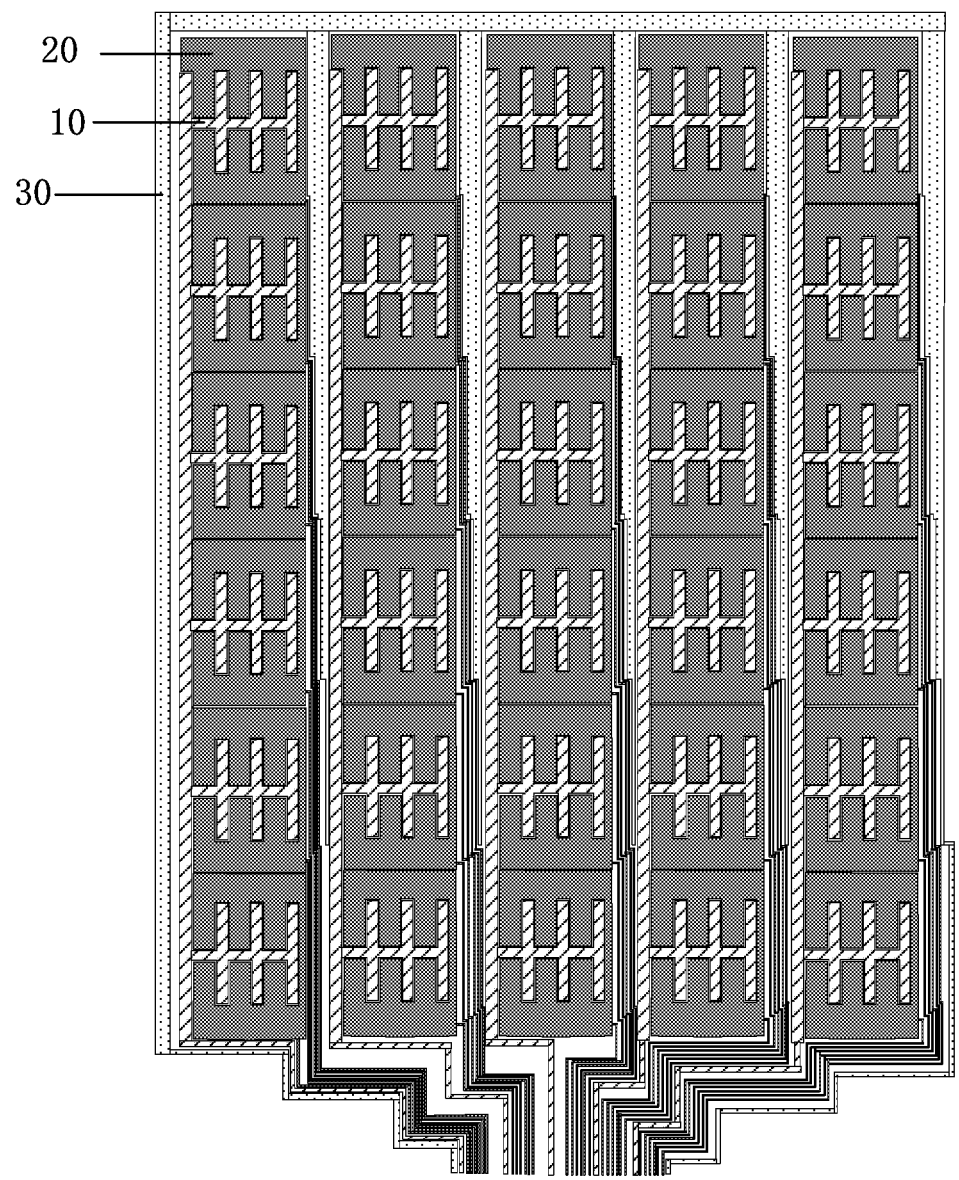
FIG. 6A a schematic diagram illustrating structure of a touch substrate according to some embodiments of the disclosure.

Reference will be made to FIG. 6A which is a schematic diagram illustrating structure of a touch substrate according to some embodiments of the disclosure. The touch substrate includes: a substrate (not shown in the figure) and a plurality of touch driving electrodes 10 and a plurality of touch sensing electrodes 20 arranged on the substrate. The touch driving electrodes 10 and the touch sensing electrodes 20 are arranged at the same layer and made of the same material, and the touch driving electrodes 10 are insulated from the touch sensing electrodes 20.

The touch substrate further includes an electrostatic discharge line 30. The electrostatic discharge line 30 is arranged at the same layer as the touch driving electrode 10 and the touch sensing electrode 20, and is made of the same material as the touch driving electrode 10 and the touch sensing electrode 20. The electrostatic discharge line 30 is insulated from the touch driving electrode 10 and the touch sensing electrode 20. Arrangement of the electrostatic discharge line 30 on the touchscreen can improve the anti-static electricity capacity of the touch substrate. Moreover, the electrostatic discharge line 30, the touch driving electrode 10 and the touch sensing electrode 20 may be formed by a single composition process, thereby saving the technological process.

Figure 6B:
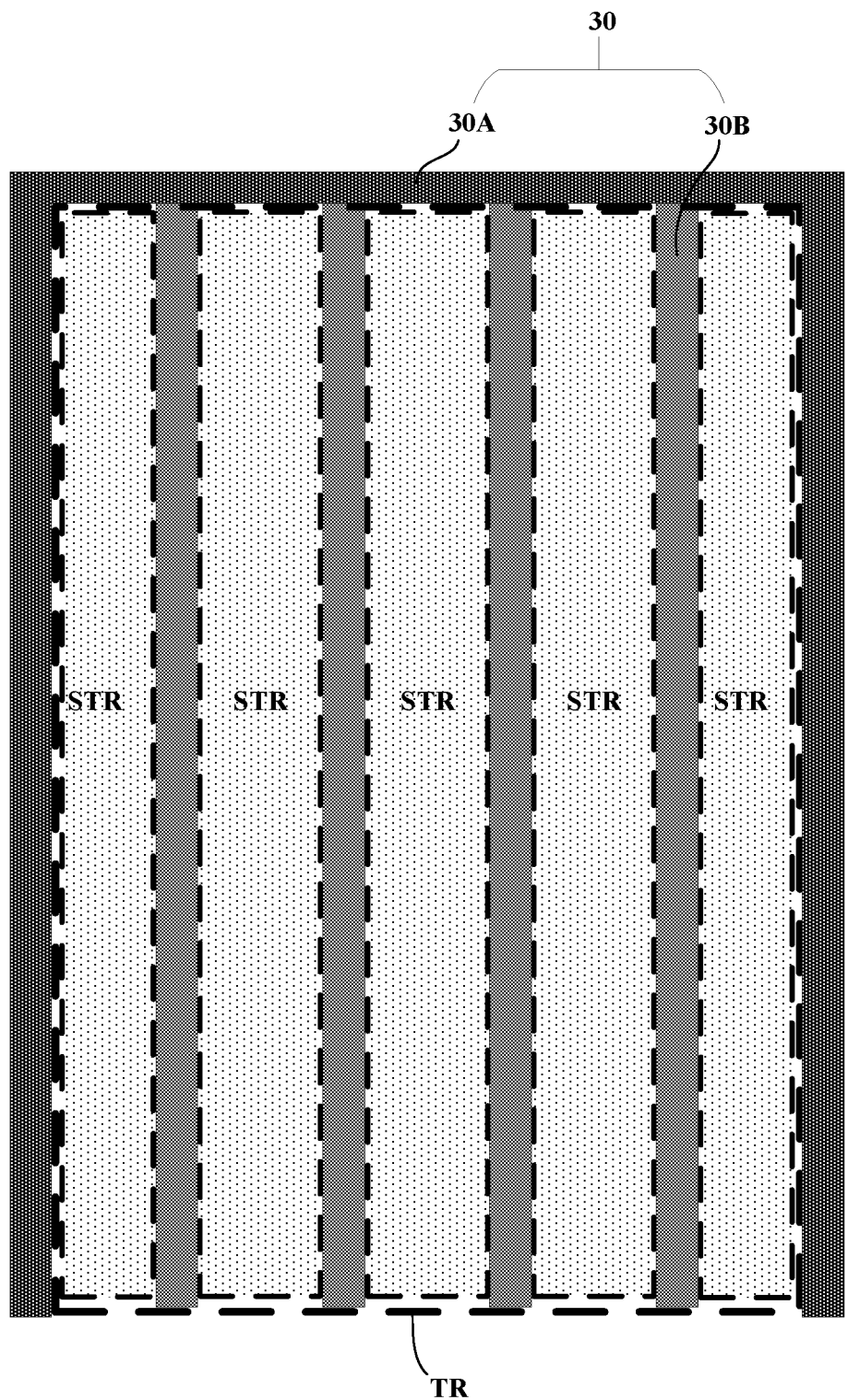
FIG. 6B is a schematic diagram illustrating structure of an electrostatic discharge line according to some embodiments of the disclosure.

FIG. 6B is a schematic diagram illustrating structure of an electrostatic discharge line according to some embodiments of the disclosure. In some embodiments of the disclosure, and referring to FIG. 6B, the electrostatic discharge line 30 is comb-like. The electrostatic discharge line 30 includes a ⌐-shaped comb ridge 30A which is arranged outside a touch region TR and a plurality of comb teeth 30B which are respectively connected with the ⌐-shaped comb ridge 30A and arranged inside the touch region TR. The touch region TR includes a plurality of regions STR. The comb ridge 30A encircles three of the sides of the touch region TR. A respective one of the plurality of comb teeth 30B extends into a space between two adjacent regions of the plurality of regions STR. The electrostatic discharge line 30 of this structure is distributed uniformly, and has an excellent electrostatic discharge property.

As an example, in some other embodiments of the disclosure, the electrostatic discharge line of another structure may be adopted.

Figure 7:
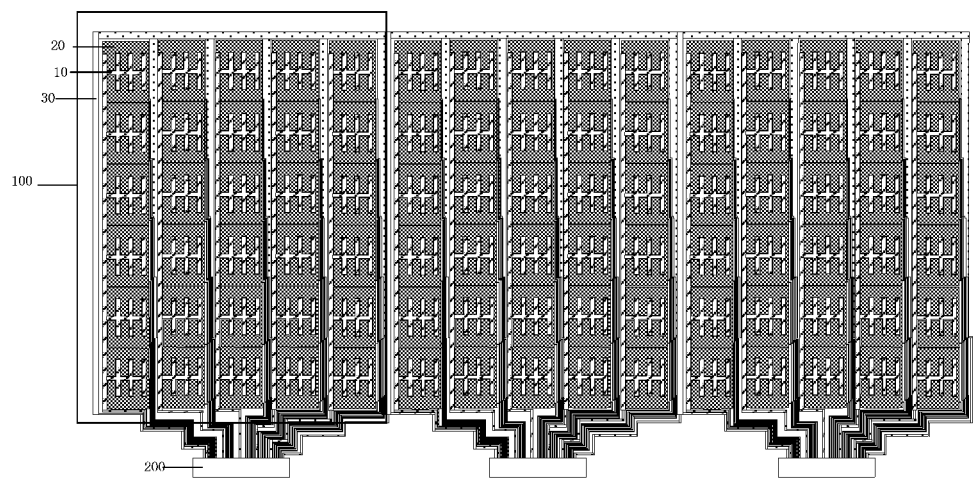
FIG. 7 is a schematic diagram illustrating structure of a touch substrate according to some embodiments of the disclosure.

Reference will be made to FIG. 7 which is a schematic diagram illustrating structure of a touch substrate according to some embodiments of the disclosure. The touch substrate includes: a substrate (not shown in the figure) and a plurality of touch driving electrodes 10 and a plurality of touch sensing electrodes 20 arranged on the substrate. The touch driving electrodes 10 and the touch sensing electrodes 20 are arranged at the same layer and made of the same material, and the touch driving electrodes 10 are insulated from the touch sensing electrodes 20. The touch substrate may be divided into a plurality of touch regions, and one touch region 100 is shown in FIG. 7. Each touch region 100 corresponds to a touch IC 200. Both the touch driving electrode 10 and the touch sensing electrode 20 in the same touch region 100 are connected with the corresponding touch IC 200. The touch substrate in some embodiments of the disclosure may be applied to a large-size touch device, and it is simple to realize the large-size touch device.

The touch substrate in some embodiments of the disclosure further includes an electrostatic discharge line 30, which is used for improving the anti-static electricity capacity of the touch substrate.

In some other embodiments of the disclosure, in order to reduce the number of the touch ICs, a touch region may correspond to an FPC. When each touch region corresponds to an FPC, the plurality of FPCs, to which a plurality of touch regions correspond respectively, are connected with the same touch IC. Sometimes, there may be ICs that may be connected to a printed circuit board (PCB), and one micro chip unit (MCU) may be placed on to the PCB.

The touch substrate in some embodiments of the disclosure may be the touchscreen of an Oncell structure, the touchscreen of an Incell structure or the touchscreen of an OGS structure. Sometime, it is possible to obtain the touch substrate as a single layer on cell (SLOC).

Figure 8:
FIG. 8 is a sectional view of a touch substrate in a One Glass Solution (OGS) structure according to some embodiments of the disclosure.

Reference will be made to FIG. 8 which is a sectional view of a touch substrate of an OGS structure according to some embodiments of the disclosure. The touchscreen includes a substrate 81, a black matrix 82, and a touch driving electrode 83 and a touch sensing electrode (not shown in the figure). The black matrix 82 is used for keeping out the light. In some embodiments, the black matrix may be omitted. The substrate 81 may be made of glass.

The method for fabricating the touch substrate in the OGS structure may include the followings:

1) forming a pattern of the black matrix 82 on the substrate 81 by processes mainly including coating photoresist, exposure, developing and so on; and 2) forming an ITO film, and then performing coating photoresist, exposing, developing, etching, stripping photoresist and other procedures, so as to form the patterns required for the touch driving electrode 83 and the touch sensing electrode.

Figure 9:
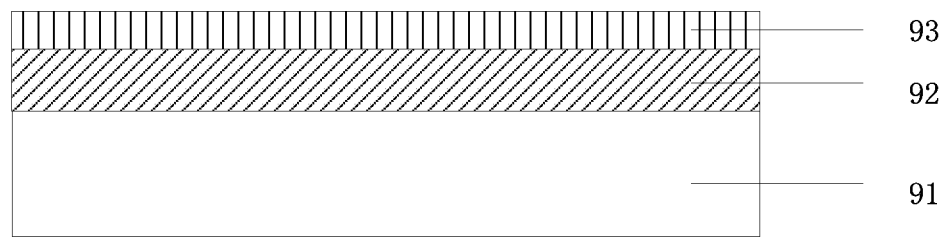
FIG. 9 is a sectional view of a touch substrate in an Oncell structure according to some embodiments of the disclosure.

Reference will be made to FIG. 9 which is a sectional view of a touch substrate of an Oncell structure according to some embodiments of the disclosure. The touchscreen includes a color film substrate 91, a touch driving electrode 92 and a touch sensing electrode (not shown in the figure), and a polarizer 93. It is possible that the color film substrate 91 may further include a color film substrate that may be made of glass material and an array layer that may be also made of glass.

The method for fabricating the touch substrate of the Oncell structure may include the followings:

1) forming the ITO film on the color film substrate 91, and then performing coating photoresist, exposing, developing, etching, stripping photoresist and other procedures, so as to form the patterns required for the touch driving electrode 92 and the touch sensing electrode needed; and 2) attaching the polarizer 93 onto the touch driving electrode 92 and the touch sensing electrode.

Some embodiments of the disclosure further provide a touch device, which includes the touch substrate according to any of the above embodiments.

The touch device further includes the touch IC, which is connected with the touch substrate and used for receiving a touch sensing signal sent by the touch driving electrode and the touch sensing electrode, and determining a touch coordinate according to the touch sensing signal.

Figure 10:
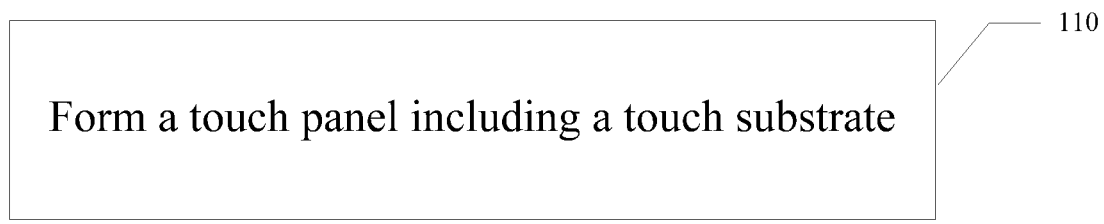
FIG. 10 illustrates a method of fabricating a display panel.

FIG. 10 illustrates a method of fabricating a display panel. In order for fabricating a display panel. A touch panel is formed to include a touch substrate 110. The touch substrate may include a plurality of regions and one of the plurality of regions may include a touch driving electrode; a touch sensing electrode that is at least partially overlapped with the touch driving electrode and touch sensing electrode is insulated from the touch driving electrode; and a touch Integrated Circuit (IC) that is connected to the touch sensing electrode, wherein the IC is capable of sensing a capacitance change when the touch driving electrode is pressed, and determining a position of the one of the plurality of regions corresponding the plurality of regions.

The method may further forming an oversized touch substrate by stitching more than one touch substrates together.

The touch substrate may include single Indium Tin Oxide (ITO) layer, and the single ITO layer may include both the touch driving electrode and the touch sensing electrode.

The method may further include forming a black matrix layer and a second substrate, where and the black matrix layer may be sandwiched between the touch substrate and the second substrate. The method may also include forming a color film substrate and a polarizer layer where the touch substrate may be placed between the polarizer layer and the color film substrate.

The touch driving electrode may be a comb-like shape, and the touch sensing electrode may cover a sensing area that is bigger than a driving area that the touch driving electrode may cover, and the sensing area may cover the driving area.

Technical terms or scientific terms used in some embodiments of the disclosure should be common meaning understood by the ordinary skill in the art of the disclosure, unless otherwise defined. The 'first', 'second' and the similar terms used in the disclosure do not represent any sequence, quantity or importance, but are just used for differentiating different components from each other. Likewise, the 'a' or 'one' and the similar terms do not represent the limit to quantity, but represents that there is at least one. The 'connection' or 'connected' and the similar terms are not limited to a physical or mechanical connection, but may include an electrical connection, whether directly or indirectly. The 'upper', 'lower', 'left' and 'right' are only used for representing a relative position relationship. When an absolute position of a descried object has changed, the relative position relationship will change correspondingly.

The above is only the preferred implementation of the disclosure. It is to be noted that those ordinary skill in the art may also make various improvements and supplements without departing from the principles of the disclosure, and these improvements and supplements should be deemed as falling within the scope of protection of the disclosure.

The invention claimed is:

1. A touch substrate, comprising a plurality of regions, wherein one of the plurality of regions comprises:
   a first electrode comprising a plurality of electrode portions, a respective one of the plurality of electrode portions comprises at least one elongated component;
   a plurality of second electrodes that correspond with the first electrode, and the plurality of second electrodes are insulated from the first electrode;
   a first touch signal line connecting the plurality of electrode portions together;
   a plurality of second touch signal lines respectively connected to the plurality of second electrodes; and
   an electrostatic discharge line;
   wherein the respective one of the plurality of electrode portions and a respective one of the plurality of second electrodes interleave with each other;
   the respective one of the plurality of electrode portions comprises:
   a trunk;
   a plurality of first branches extending from the trunk along a first direction away from the trunk; and
   a plurality of second branches extending from the trunk along a second direction away from the trunk;
   wherein the electrostatic discharge line comprises a ⌐-shaped comb ridge outside a touch region comprising the plurality of regions, and a plurality of comb teeth inside the touch region and respectively connected with the ⌐-shaped comb ridge;
   the ⌐-shaped comb ridge encircles three sides of the touch region; and
   a respective one of the plurality of comb teeth extends into a space between two adjacent regions of the plurality of regions;
   wherein the first direction is opposite to the second direction;
   the plurality of first branches respectively connect to a plurality of first portions of the trunk;
   the plurality of second branches respectively connect to a plurality of second portions of the trunk;
   the trunk has an elongated shape;
   the plurality of first portions and the plurality of second portions are aligned along a longitudinal dimension of the elongated shape;
   one of the plurality of first portions is between two directly adjacent second portions of the plurality of second portions;
   each of the two directly adjacent second portions is aligned with the one of the plurality of first portions along the longitudinal dimension of the elongated shape;
   one of the plurality of second portions is between two directly adjacent first portions of the plurality of first portions; and
   each of the two directly adjacent first portions is aligned with the one of the plurality of second portions along the longitudinal dimension of the elongated shape.

2. The touch substrate of claim 1, wherein the one of the plurality of regions further comprises:
   a touch Integrated Circuit (IC) that is connected to the plurality of second touch signal lines, wherein the IC is capable of sensing a capacitance change upon a touch, and determining a position in the one of the plurality of regions corresponding to the touch.

3. The touch substrate of claim 2, wherein the first electrode is a touch driving electrode and the respective one of the plurality of second electrodes is a touch sensing electrode.

4. The touch substrate of claim 2, wherein the first electrode comprises more than one elongated component to form a pattern, and the respective one of the plurality of second electrodes substantially matches the pattern.

5. The touch substrate of claim 4, wherein the pattern comprises at least one of: a comb-like shape, a star-like shape, a tree-like shape, a finger-like shape, a triangle-like shape, or a shape where a first the more than one elongated component crosses with a second the more than one elongated component.

6. The touch substrate of claim 2, wherein an oversized touch substrate is formed by stitching more than one touch substrate together.

7. The touch substrate of claim 3, wherein the touch substrate comprises a single Indium Tin Oxide (ITO) layer, and the single ITO layer comprises both the touch driving electrode and the touch sensing electrode.

8. A touch panel comprising a touch substrate, wherein the touch substrate comprises a plurality of regions;
   wherein one of the plurality of regions comprises:
   a first electrode comprising a plurality of electrode portions, a respective one of the plurality of electrode portions comprises at least one elongated component;
   a plurality of second electrodes that correspond with the first electrode, and the plurality of second electrodes are insulated from the first electrode;
   a first touch signal line connecting the plurality of electrode portions together;
   a plurality of second touch signal lines respectively connected to the plurality of second electrodes; and
   an electrostatic discharge line;
   wherein the respective one of the plurality of electrode portions and a respective one of the plurality of second electrodes interleave with each other;
   the respective one of the plurality of electrode portions comprises:
   a trunk;
   a plurality of first branches extending from the trunk along a first direction away from the trunk; and
   a plurality of second branches extending from the trunk along a second direction away from the trunk;
   wherein the electrostatic discharge line comprises a ⌐-shaped comb ridge outside a touch region comprising the plurality of regions, and a plurality of comb teeth inside the touch region and respectively connected with the ⌐-shaped comb ridge;
the ⌐-shaped comb ridge encircles three sides of the touch region; and
a respective one of the plurality of comb teeth extends into a space between two adjacent regions of the plurality of regions;
wherein the first direction is opposite to the second direction;
the plurality of first branches respectively connect to a plurality of first portions of the trunk;
the plurality of second branches respectively connect to a plurality of second portions of the trunk;
the trunk has an elongated shape;
the plurality of first portions and the plurality of second portions are aligned along a longitudinal dimension of the elongated shape;
one of the plurality of first portions is between two directly adjacent second portions of the plurality of second portions;
each of the two directly adjacent second portions is aligned with the one of the plurality of first portions along the longitudinal dimension of the elongated shape;
one of the plurality of second portions is between two directly adjacent first portions of the plurality of first portions; and
each of the two directly adjacent first portions is aligned with the one of the plurality of second portions along the longitudinal dimension of the elongated shape.

9. The touch panel of claim 8, wherein the one of the plurality of regions further comprises:
a touch Integrated Circuit (IC) that is connected to the plurality of second touch signal lines, wherein the IC is capable of sensing a capacitance change upon a touch, and determining a position in the one of the plurality of regions corresponding to the touch.

10. The touch panel of claim 9, wherein the first electrode is a touch driving electrode and the respective one of the plurality of second electrodes is a touch sensing electrode.

11. The touch panel of claim 9, wherein the first electrode comprises more than one elongated component to form a pattern, and the respective one of the plurality of second electrodes substantially matches the pattern.

12. The touch panel of claim 11, wherein the pattern comprises at least one of: a comb-like shape, a star-like shape, a tree-like shape, a finger-like shape, a triangle-like shape, or a shape where a first the more than one elongated component crosses with a second the more than one elongated component.

13. The touch panel of claim 9, further comprising an oversized touch substrate wherein the oversized touch substrate is formed by stitching more than one touch substrate together.

14. The touch panel of claim 10, wherein the touch substrate comprises a single Indium Tin Oxide (ITO) layer, and the single ITO layer comprises both the touch driving electrode and the touch sensing electrode.

15. The touch panel of claim 9, further comprising a black matrix layer and a second substrate, wherein the black matrix layer is sandwiched between the touch substrate and the second substrate.

16. The touch panel of claim 9, further comprising a color film substrate and a polarizer layer, wherein the touch substrate is placed between the polarizer layer and the color film substrate.

17. A method of fabricating a display panel, comprising:
forming a touch panel comprising a touch substrate, wherein the touch substrate comprises a plurality of regions; and
wherein one of the plurality of regions comprises:
a first electrode comprising a plurality of electrode portions, a respective one of the plurality of electrode portions comprises at least one elongated component;
a plurality of second electrodes that correspond with the first electrode, and the plurality of second electrodes are insulated from the first electrode;
a first touch signal line connecting the plurality of electrode portions together;
a plurality of second touch signal lines respectively connected to the plurality of second electrodes; and
an electrostatic discharge line;
wherein the respective one of the plurality of electrode portions and a respective one of the plurality of second electrodes interleave with each other;
the respective one of the plurality of electrode portions comprises:
a trunk;
a plurality of first branches extending from the trunk along a first direction away from the trunk; and
a plurality of second branches extending from the trunk along a second direction away from the trunk;
wherein the electrostatic discharge line comprises a ⌐-shaped comb ridge outside a touch region comprising the plurality of regions, and a plurality of comb teeth inside the touch region and respectively connected with the ⌐-shaped comb ridge;
the ⌐-shaped comb ridge encircles three sides of the touch region; and
a respective one of the plurality of comb teeth extends into a space between two adjacent regions of the plurality of regions;
wherein the first direction is opposite to the second direction;
the plurality of first branches respectively connect to a plurality of first portions of the trunk;
the plurality of second branches respectively connect to a plurality of second portions of the trunk;
the trunk has an elongated shape;
the plurality of first portions and the plurality of second portions are aligned along a longitudinal dimension of the elongated shape;
one of the plurality of first portions is between two directly adjacent second portions of the plurality of second portions;
each of the two directly adjacent second portions is aligned with the one of the plurality of first portions along the longitudinal dimension of the elongated shape;
one of the plurality of second portions is between two directly adjacent first portions of the plurality of first portions; and
each of the two directly adjacent first portions is aligned with the one of the plurality of second portions along the longitudinal dimension of the elongated shape.

18. The method of claim 17, wherein the one of the plurality of regions further comprises:
a touch Integrated Circuit (IC) that is connected to the plurality of second touch signal lines, wherein the IC is capable of sensing a capacitance change upon a touch, and determining a position in the one of the plurality of regions corresponding to the touch.

19. The method of claim 18, wherein the first electrode comprises more than one elongated component to form a pattern and the respective one of the plurality of second electrodes substantially matches the pattern, wherein the pattern comprises at least one of: a comb-like shape, a star-like shape, a tree-like shape, a finger-like shape, a triangle-like shape, or a shape where a first the more than one elongated component crosses with a second the more than one elongated component.

* * * * *